United States Patent
Bicer et al.

(10) Patent No.: US 11,930,750 B2
(45) Date of Patent: Mar. 19, 2024

(54) GREENHOUSE AND COOLING SYSTEM OF THE SAME

(71) Applicant: Qatar Foundation for Education, Science and Community Development, Doha (QA)

(72) Inventors: Yusuf Bicer, Doha (QA); Muhammad Usman Sajid, Doha (QA)

(73) Assignee: QATAR FOUNDATION FOR EDUCATION, SCIENCE AND COMMUNITY DEVELOPMENT, Doha (QA)

( * ) Notice: Subject to any disclaimer, the term of this patent is extended or adjusted under 35 U.S.C. 154(b) by 420 days.

(21) Appl. No.: 17/369,281

(22) Filed: Jul. 7, 2021

(65) Prior Publication Data
US 2022/0007592 A1    Jan. 13, 2022

Related U.S. Application Data

(60) Provisional application No. 63/049,347, filed on Jul. 8, 2020.

(51) Int. Cl.
| | |
|---|---|
| A01G 9/24 | (2006.01) |
| B01D 1/00 | (2006.01) |
| B01D 3/06 | (2006.01) |
| C02F 1/06 | (2023.01) |
| C02F 1/14 | (2023.01) |

(Continued)

(52) U.S. Cl.
CPC .............. *A01G 9/24* (2013.01); *A01G 9/243* (2013.01); *B01D 1/0035* (2013.01); *B01D 3/06* (2013.01); *C02F 1/06* (2013.01); *C02F 1/14* (2013.01); *F25B 27/007* (2013.01); *C02F 2103/08* (2013.01)

(58) Field of Classification Search
CPC ........ Y02A 40/25; A01G 9/243; A01G 9/246; F24S 80/20
See application file for complete search history.

(56) References Cited

U.S. PATENT DOCUMENTS

| | | | |
|---|---|---|---|
| 4,173,212 A | 11/1979 | Whitcomb | |
| 4,306,542 A | 12/1981 | Reinert | |

(Continued)

FOREIGN PATENT DOCUMENTS

| | | | |
|---|---|---|---|
| CN | 1315641 A | * | 10/2001 |
| CN | 1975282 A | * | 6/2007 |

(Continued)

OTHER PUBLICATIONS

Otanicar, et al; "Experimental evaluation of a prototype hybrid CPV/T system utilizing a nanoparticle fluid absorber at elevated temperatures"; Applied Energy, vol. 228, pp. 1531-1539, Oct. 2018; (3 pages).

(Continued)

*Primary Examiner* — Eric S Ruppert
(74) *Attorney, Agent, or Firm* — K&L Gates LLP

(57) ABSTRACT

A system includes a greenhouse and nanofluid configured to flow around the greenhouse and absorb some or significant portion of solar spectrum having a wavelength equal to or greater than 750 nm to reduce a cooling load inside the greenhouse. The system further includes a duct channel. The nanofluid flows around the greenhouse through the duct channel.

9 Claims, 16 Drawing Sheets

(51) Int. Cl.
*F25B 27/00* (2006.01)
*C02F 103/08* (2006.01)

(56) References Cited

U.S. PATENT DOCUMENTS

| | | |
|---|---|---|
| 6,284,383 B1 | 9/2001 | Nishiyama |
| 8,186,100 B2 | 5/2012 | Chuang et al. |
| 8,745,919 B2 | 6/2014 | Chang |
| 9,554,523 B2 | 1/2017 | Carroll et al. |
| 2011/0016779 A1 | 1/2011 | Hermans et al. |
| 2017/0029635 A1 | 2/2017 | Doll et al. |

FOREIGN PATENT DOCUMENTS

| | | | | |
|---|---|---|---|---|
| CN | 202083061 U | * | 12/2011 | ............ F25B 27/007 |
| CN | 102381796 A | * | 3/2012 | |
| JP | 2003240272 A | * | 8/2003 | |
| WO | 97000006 | | 1/1997 | |
| WO | 2008135990 A2 | | 11/2008 | |
| WO | 2014206565 A1 | | 12/2014 | |

OTHER PUBLICATIONS

Sonneveld, et al.; "Feasibility study for combining cooling and high grade energyproduction in a solar greenhouse"; Biosystems Engineering, vol. 105, Issue 1; Jan. 2010; pp. 51-58; (2 pages).

Wang, et al; "A nano-photonic filter for near infrared radiative heater"; Applied. Therm. Eng., vol. 153, pp. 221-224, May 2019; (3 pages).

Bartzanas, et al; "Heat and mass transfer in a large evaporative cooled greenhouse equipped with a progressive shading"; Acta Hortic., No. 691, pp. 625-632, Oct. 2005; (2 pages).

Davies, et al; "Ideal performance of a self-cooling greenhouse"; Appl. Therm. Eng., vol. 149, pp. 502-511, Feb. 2019; (7 pages).

* cited by examiner

GREENHOUSE AND COOLING SYSTEM OF THE SAME

PRIORITY CLAIM

This application claims priority to U.S. Provisional Patent Application No. 63/049,347, filed on Jul. 8, 2020, the entire contents of which are hereby incorporated by reference and relied upon.

BACKGROUND

The open field farming may have to face sever environmental conditions due to geographical position of cultivate place. Furthermore, environmental degradation by human exploitations urbanization, desertification and salinization have exacerbated the food security and agricultural production. The modern cultivation techniques in greenhouses have proved to be more effective, ecological and water saving even in harsh environmental conditions. Greenhouses provide a way for plant production under controlled environmental conditions. The temperature, sunlight and humidity are considered as critical parameters related to greenhouses. However, the major driving force for overheating greenhouse is the excess solar radiation, which causes a lot of issues to greenhouse. Thus, there is a need for reducing the overheating from the excess solar radiation.

SUMMARY

The present disclosure generally relates to greenhouses and cooling systems of the greenhouses.

In light of the present disclosure, and without limiting the scope of the disclosure in any way, in an aspect of the present disclosure, which may be combined with any other aspect listed herein unless specified otherwise, a greenhouse system is provided. The system includes a greenhouse and nanofluid configured to flow around the greenhouse and absorb some or significant portion of solar spectrum having a wavelength equal to or greater than 750 nm to reduce a cooling load inside the greenhouse.

In some examples, the system further includes a duct channel. The nanofluid is configured to flow around the greenhouse through the duct channel.

In some examples, the system further includes a pump configured to circulate the nanofluid.

In some examples, the nanofluid is configured to have higher transmittance in visible spectrum having a wavelength equal to or greater than 400 nm and lower than 750 nm.

In some examples, the nanofluid includes CuO, TiN, and CuS.

In some examples, the system further includes an evacuated tube collector (ETC) configured to convert a solar energy into a heat.

In some examples, the system further includes a thermal storage tank, wherein working fluid absorbs the heat from the ETC and transfers the heat to the thermal storage tank, wherein the heat transferred to the thermal storage tank is used to operate a desalination system and a cooling system.

In some examples, the system further includes a photovoltaic thermal (PV/T) system having a photovoltaic (PV) cell. The nanofluid is further configured to absorb a heat from the PV/T system, reducing a temperature of the PV cell.

In some examples, the heat absorbed from the PV/T system is used to pre-heat saline water.

In some examples, the system further includes a desalination system configured to receive the pre-heated saline water and distill the pre-heated saline water.

In some examples, the system further includes a cooling system configured to cool the greenhouse using a heat generated from an evacuated tube collector (ETC).

In some examples, the cooling system includes: a generator configured to, using the heat from the ETC, generate a vapor of a refrigerant; a condenser configured to condense the vapor to produce a condensed refrigerant; an expansion device configured to reduce a pressure of the condensed refrigerant to produce a low pressure refrigerant; and an evaporator. The system is configured to provide the low pressure refrigerant to the evaporator so that the low pressure refrigerant absorbs a heat from the evaporator and is evaporated. The absorption of the heat from the evaporator reduces a temperature of the evaporator, thereby cooling the greenhouse connected to the evaporator.

In some examples, the cooling system further includes an absorber configured to receive the evaporated refrigerant and mix the evaporated refrigerant with a lean solution of an additional refrigerant to produce a strong solution of a second refrigerant, wherein the strong solution of the second refrigerant is transferred to the generator.

In some examples, the refrigerant includes $LiBr-H_2O$.

In light of the present disclosure, and without limiting the scope of the disclosure in any way, in an aspect of the present disclosure, which may be combined with any other aspect listed herein unless specified otherwise, a greenhouse system is provided. The system includes a greenhouse; nanofluid configured to flow around the greenhouse and absorb some or significant portion of solar spectrum having a wavelength equal to or greater than 750 nm to reduce a cooling load inside the greenhouse; an evacuated tube collector (ETC) configured to convert a solar energy into a first heat; a photovoltaic thermal (PV/T) system having a photovoltaic (PV) cell, wherein the nanofluid is further configured to absorb a second heat from the PV/T system, reducing a temperature of the PV cell, wherein the second heat absorbed from the PV/T system is used to pre-heat saline water; a desalination system configured to receive the pre-heated saline water and distill the pre-heated saline water; and a cooling system configured to cool the greenhouse using the second heat generated from the ETC.

In some examples, the system further includes a thermal storage tank. Working fluid absorbs the first heat from the ETC and transfers the first heat to the thermal storage tank. The first heat transferred to the thermal storage tank is used to operate the desalination system and the cooling system.

In some examples, the cooling system includes: a generator configured to, using the first heat from the ETC, generate a vapor of a refrigerant; a condenser configured to condense the vapor to produce a condensed refrigerant; an expansion device configured to reduce a pressure of the condensed refrigerant to produce a low pressure refrigerant; and an evaporator, wherein the system is configured to provide the low pressure refrigerant to the evaporator so that the low pressure refrigerant absorbs a third heat from the evaporator and is evaporated. The absorption of the third heat from the evaporator reduces a temperature of the evaporator, thereby cooling the greenhouse connected to the evaporator.

In some examples, the cooling system further includes an absorber configured to receive the evaporated refrigerant and mix the evaporated refrigerant with a lean solution of an additional refrigerant to produce a strong solution of a second refrigerant, wherein the strong solution of the second refrigerant is transferred to the generator. The refrigerant includes LiBr—H$_2$O.

In some examples, the nanofluid includes CuO, TiN, and CuS.

In some examples, the nanofluid is configured to have higher transmittance in visible spectrum having a wavelength equal to or greater than 400 nm and lower than 750 nm.

The reader will appreciate the foregoing details, as well as others, upon considering the following detailed description of certain non-limiting embodiments of the greenhouses and the cooling systems of the greenhouses according to the present disclosure.

BRIEF DESCRIPTION OF THE DRAWINGS

Features and advantages of the technology described herein may be better understood by reference to the accompanying drawings in which.

DETAILED DESCRIPTION

Figure 1:
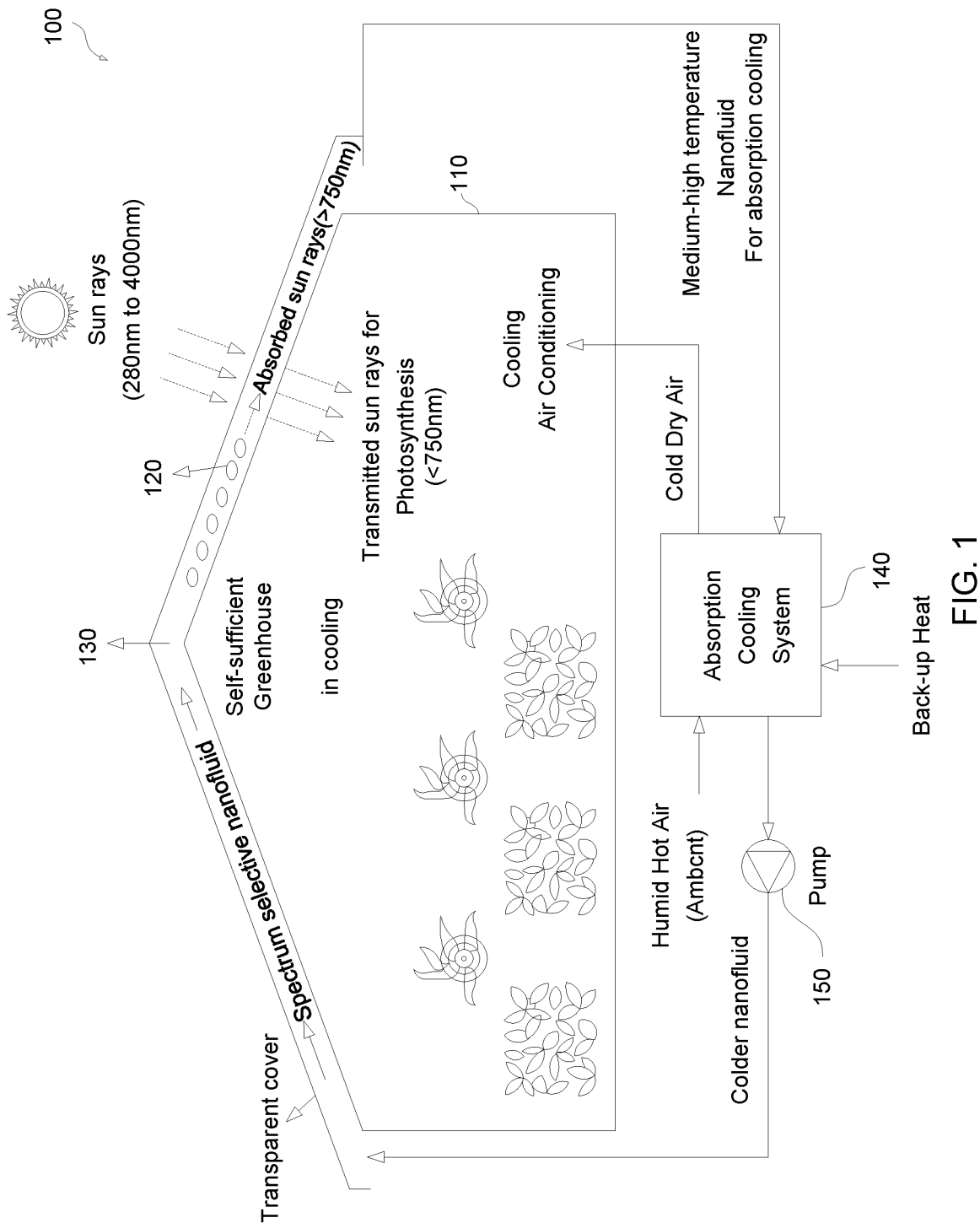
FIG. 1 shows a schematic diagram of an example greenhouse system according to an example of the present disclosure.

The present disclosure generally relates to greenhouse systems and cooling systems of greenhouses.

In some examples, a greenhouse system may utilize a spectrum filtering mechanism to reduce the amount of non-useful photons entering the greenhouses. The sunlight is the natural source of energy and life for plants and animals in addition to humankind. Sunlight is an electromagnetic wave consisting of photons having different wavelengths and intensities (from 280 nm to 4000 nm having a peak in the visible light region). The visible portion of the solar spectrum may constitute about 44% of the energy contained in the solar radiation. The major driving force for the overheating of greenhouses in these hot areas such as Qatar is the excess solar radiation, which may not be utilized by the plants.

The photosynthesis may occur between wavelengths of 400 nm and 750 nm due to selectivity of chlorophyll pigment, which may not fully absorb even the complete visible spectrum due to its nature. Therefore, the energy converted by crop photosynthesis in a greenhouse may be less than 10% of the available solar energy, which is very small amount considering the heat load of the greenhouse. About 50 to 60% of the absorbed solar radiation may be converted to latent heat by crop evaporation and the remaining sensible heat may increase greenhouse temperature. Presently, conventional cooling by ventilation is applied to withdraw the excess sensible heat from the greenhouses. Therefore, there arises a high cooling load in regions with dry outdoor conditions.

Aspects of the present disclosure may provide a solution to resolve the issues in the conventional greenhouse system, for example, by blocking the non-useful photons (above 750 nm) entering the greenhouses. In this way, significant portion of the solar radiation contributing to the temperature rise inside the greenhouse may be removed. To achieve this, aspects of the present disclosure may use spectrum selective nanofluid. In some examples, the nanofluid may flow through the roof of the greenhouse (e.g., using a duct channel). The nanofluid may transmit the visible spectrum of sunlight inside greenhouse while absorbing the infrared spectrum which is main cause of heating inside the greenhouse.

Aspects of the present disclosure may also provide a self-sustaining greenhouse system. For example, the greenhouse system according to the present disclosure may produce water and electricity on the site. For that purpose, the greenhouse system according to the present disclosure may include a photovoltaic thermal system (PV/T) to meet the electricity requirements of the greenhouse and a multi-stage flash desalination system to fulfil the water requirements of the plants. The solar energy may be utilized as a source of thermal energy input to the multi-stage flash desalination system. In some examples, the thermal energy of the PV/T system can be utilized to pre-heat the water (e.g., saline water) entering the multi-stage flash desalination unit, which may reduce the amount of thermal energy required for desalination. In some examples, the greenhouse system according to the present disclosure may also include an evacuated tube collectors that can raise the temperature of heat transferring fluid to a target value that is desirable for the operation of the multi-stage flash desalination process. In some examples, the greenhouse system according to the present disclosure may further include a cooling system (e.g., vapor absorption cooling system). The heat transferring fluid from the multi-stage flash desalination system may be transferred to and used by the vapor absorption cooling system. In this way, aspects of the present disclosure may provide a self-sustaining greenhouse system, where the whole greenhouse system may work in harmony, making it (i) more environmentally friendly by using the solar energy for the production of the electricity and water, (ii) have less cooling load by using the spectrum selective nanofluid, and (iii) more cost effective due to the improved efficiency and reduced cooling load.

FIG. 1 illustrates a schematic diagram of an example greenhouse system 100 according to an example of the present disclosure. In some examples, the system 100 may include a greenhouse 110 and spectrum selective nanofluid 120. The nanofluid 120 may flow around the greenhouse and absorb solar spectrum having a wavelength equal to or greater than a cut-off wavelength to reduce a cooling load inside the greenhouse 110.

In some examples, the cut-off wavelength may be different depending on the materials and concentration of nanoparticles used for the nanofluid. In some examples, the cut-off wavelength may be about 750 nm. In some examples, the cut-off wavelength may be about 700 nm to about 750 nm, about 750 nm to about 800 nm, about 800 nm to about 850 nm, about 850 nm to about 900 nm, about 900 nm to about 950 nm, about 950 nm to about 1000 nm, about 1000 nm to about 1100 nm, about 1100 nm to about 1200 nm, about 1200 nm to about 1300 nm, about 1300 nm to about 1400 nm, and/or about 1400 nm to about 1500 nm, about 700 nm or above, about 800 nm or above, about 850 nm or above, about 900 nm or above, about 950 nm or above, about 1000 nm or above, about 1100 nm or above, about 1200 nm or above, about 1300 nm or above, and/or about 1400 nm or above.

In some examples, the nanofluid may be configured to transmit visible spectrum having a wavelength equal to or greater than 400 nm and lower than 750 nm. Examples of the nanofluid may include CuO, TiN, CuS, and/or any suitable combinations thereof. In some examples, the nanofluids may block certain portions (e.g., over 30%, over 40%, over 50%, over 60%, over 70%, over 80%, and/or over 90%) of spectrum equal to or above 750 nm and below 1400 nm, and block almost all portions (e.g., over 95%, over 97%, and/or over 99%) of spectrum equal to or above 1400 nm. In some examples, nanofluid absorbing "some or significant portion" of solar spectrum having a wavelength equal to or greater than 750 nm may refer to this situation.

In some examples, the system 100 may further include a duct channel 130. The nanofluid 120 may flow around the greenhouse through the duct channel 130. In some examples, the duct channel 130 may be disposed on the roof of the greenhouse 110. In other examples, the duct channel 130 may be disposed in any other suitable place around the greenhouse 110. In some examples, the duct channel 130 may include a transparent cover.

In some examples, the system 100 may include a cooling system 140 (e.g., absorption cooling system). The cooling system 140 may be configured to reduce a temperature of the greenhouse 110. For example, the cooling system 140 may be configured to receive humid hot air and process it to output cold dry air. As illustrated in FIG. 1, the cooling system 140 may be also configured to receive heated nanofluid and process it to output colder nanofluid. That is, the nanofluid 120 that is heated after receiving the sun rays (e.g., while the nanofluid was on the roof of the greenhouse 110) may be also cooled by the cooling system 140.

In some examples, the system 100 may also include a pump 150. The pump 150 may be configured to circulate the nanofluid within the system 100 (for example, through the duct channel 130).

Figure 2:
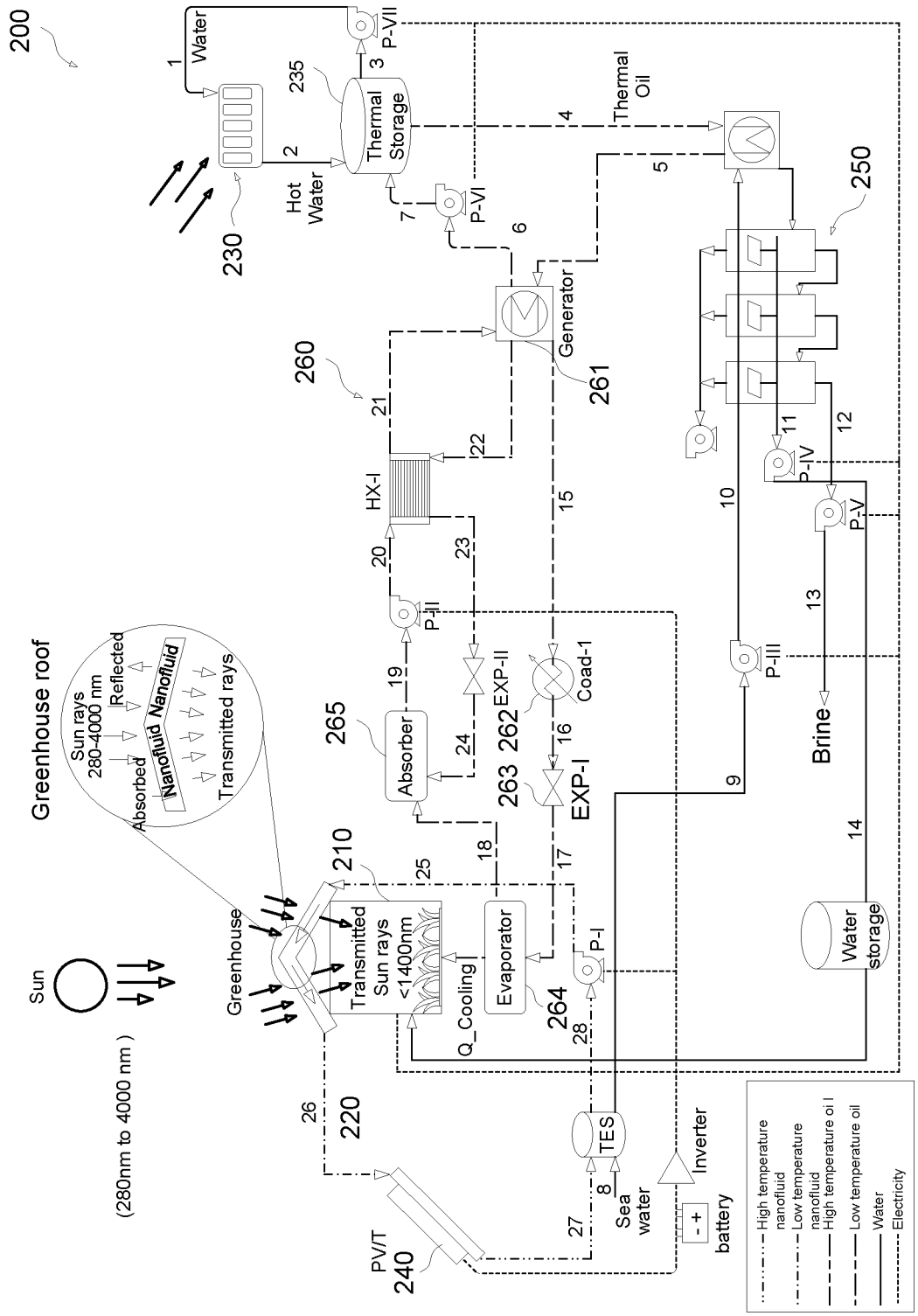
FIG. 2 shows a schematic diagram of an example greenhouse system according to an example of the present disclosure.

FIG. 2 illustrates a schematic diagram of an example self-sustaining greenhouse system 200 according to an example of the present disclosure. In some examples, some aspects of the system 200 may be the same as and/or similar to the ones in the system 100 of FIG. 1. Therefore, duplicative description of the configuration/feature/characteristic of the components of the system (e.g., nanofluid, duct channel, cooling system etc.) may be omitted.

The system 200 may include a greenhouse 210, spectrum selective nanofluid 220, an evacuated tube collector (ETC) 230, a thermal storage tank 235, a photovoltaic thermal (PV/T) system 240, a desalination system 250, and/or a cooling system 260. As illustrated in FIG. 2, the nanofluid 220 may flow around the greenhouse 210 (for example, through a duct channel on the roof of the greenhouse 210). The nanofluid 220 may be circulated by a pump. The nanofluid 220 may absorb some or significant portion of solar spectrum having a wavelength equal to or greater than a cut-off wavelength to reduce a cooling load inside the greenhouse 210. The cut-off wavelength of the nanofluid of the system 200 may be the same as and/or similar to the cut-off wavelength of the nanofluid of the system 100 and, thus, duplicative description may be omitted.

The ETC 230 may convert a solar energy into first heat. The ETC 230 may be advanced forms of flat plate collectors. In some examples, the temperature that can be achieved by using the evacuated tube collectors may be in a range of 90° C.-120° C. with an efficiency of up to 60%. In some examples, water may be used as a working fluid in the ETC 230. The working fluid may take a heat from the collector and transfer it to the thermal storage tank 235, for example, using PCM (Paraffin RT-100HC) as an energy storage medium with a melting temperature of 100° C.

The PV/T system 240 may convert the solar energy into electricity and heat. In some examples, the PV/T system 240 may include one or more photovoltaic (PV) cells. The PV cells may convert the solar energy into electricity. The electricity generated by the PV cells may be used for the operation of the system 200. The rise in the temperature of the PV cell may have an adverse effect on its efficiency. The PV/T system 240 may combine the PV cells/panels with thermal systems, which can reduce the temperature of PV cells and the heat gained from the PV cells can be utilized for useful purposes. For example, the nanofluid 240 may be used as a coolant in the PV/T system 240. The nanofluid 240 may have thermo-physical properties superior over water and other fluids. The nanofluid may absorb the heat from the PV/T system 240, reducing a temperature of the PV cells and the PV/T system 240. The heat absorbed from the PV/T system 240 may be used to pre-heat saline water (e.g., sea water or saline groundwater).

The desalination system 250 (e.g., multi-stage flash desalination system) may receive the pre-heated saline water and distill the pre-heated saline water. For example, the heated saline water may be then fed into a heater of the desalination system 250. In some examples, the heater may be at the temperature of 97° C. This feed may pass through various stages of the desalination system 250, and the distillate may be separated out, and the low-temperature brine may be pumped back to the sea. The distilled water may be used for plants in the greenhouse 210.

The sunlight consists of infrared radiations, which are also known as heat radiations. These radiations are typically trapped in the greenhouse and cause a significant rise in temperature. In order to maintain the optimum temperature inside the greenhouse at the hot climate conditions, the system 200 may further include the cooling system 260 to reduce the temperature of the greenhouse 210.

In some examples, the cooling system 260 may be a vapor absorption system. Vapor absorption systems may have several advantages over vapor compression systems, such as (i) utilizing low graded energy like heat as an input, (ii) smooth operation, (iii) operating at a lower evaporator pressure without affecting the COP, and (iv) insignificant effect of load variation on the performance. In some examples, the cooling system 260 may use a LiBr-H2O mixture as a working fluid.

The cooling system 260 may include a generator 261, a condenser 262, an expansion valve/device 263, an evaporator 264, and an absorber 265. The generator 261 may generate a vapor of a refrigerant. In some examples, the generator 261 may use the heat generated from the ETC (e.g., the heat from the thermal storage tank 235) to generate the vapor of the refrigerant. For example, as illustrated in FIG. 2, the heat stored in the thermal storage tank 235 may be transferred (for example, through a heat transferring fluid, such as a thermal oil) to the desalination system 250 for the operation of the desalination system 250, and then, this heat is transferred to the generator 261 (for example, through the heat transferring fluid).

The condenser 262 may receive the vapor of the refrigerant and condense the vapor of the refrigerant (for example, by removing the latent heat) to produce a condensed refrigerant. The expansion device 263 may receive the condensed refrigerant and reduce the pressure of the condensed refrigerant. The evaporator 264 may receive the low pressure refrigerant from the expansion device 263. In the evaporator 264, the low pressure refrigerant may absorb a heat from the evaporator 264 and may be evaporated. The absorption of the heat from the evaporator 264 may reduce a temperature of the evaporator 264, thereby cooling the greenhouse 210 connected to the evaporator 264.

The absorber 265 may receive the evaporated refrigerant and mix the evaporated refrigerant with a lean solution of an additional refrigerant to produce a strong solution (of the refrigerant). The strong solution of the refrigerant may be transferred to the generator and the cycle continues. In some examples, the refrigerant may include a LiBr—H$_2$O mixture.

EXAMPLES

In these examples, energy and exergy efficiencies of an example greenhouse system according to the present disclosure is evaluated and provided. For example, in order to estimate the significance of the application of the nanofluid, the energy and exergy efficiencies of the overall system employing PV/T modules are compared with the system using PV panels only, to meet the electricity demand of the greenhouse. When the PV panels are used, then the nanofluid will not be flowing through the roof of the greenhouse, which means that the greenhouse is exposed to the full solar spectrum (280-4000 nm), and the seawater will be entering the desalination unit without being pre-heated. More detailed conditions/features of the main components of the greenhouse system (e.g., ETC, PV/T system, desalination system, cooling system) will be discussed below.

1. Example System Description 1.1 ETC

In the present examples, water is used as a working fluid in the ETC, which takes heat from the collector and transfers it to a thermal storage tank using PCM (Paraffin RT-100HC) as an energy storage medium with a melting temperature of 100° C. The thermal storage tank charges during day time when solar energy is available in the excess and can fulfill energy demand at night time when there is no availability of sun. The thermal efficiency of ETC ($\eta_{th,ETC}$) is computed using Hottel-Whillier Bliss equation as given by Eq(1):

$$\eta_{th,ETC} = F(\tau\alpha)_n K(\theta) - C_1\left(\frac{T_m - T_a}{I}\right) - C_2\left(\frac{(T_m - T_a)^2}{I}\right) \quad (1)$$

where $F(\tau\alpha)_n$ is zero loss efficiency of collector at normal irradiance, $K(\theta)$ is incidence angle modifier, $T_m$ is the mean temperature of the fluid in the collector, $T_a$ is ambient temperature, I is global irradiance, $C_1$ and $C_2$ are first and second-order heat loss coefficients, respectively. The performance-related parameters of ETC considered in the present study resulted in Eq(2)

$$\eta_{th,ETC} = 0.687 - 1.505\left(\frac{T_m - T_a}{I}\right) - 0.011\left(\frac{(T_m - T_a)^2}{I}\right) \quad (2)$$

The useful heat ($\dot{Q}_u$) gained by ETC can be calculated from Eq(3)

$$\dot{Q}_u = \eta_{th,ETC} A_{ETC} I \quad (3)$$

For thermal energy storage, the rate of energy lost ($\dot{Q}_{lost,TES}$) can be expressed as Eq(4)

$$\dot{Q}_{lost,TES} = \dot{Q}_{charging} - \dot{Q}_{Discharging} \quad (4)$$

where $\dot{Q}_{charging}$ and $\dot{Q}_{Discharging}$ can be found from Eq(5) and Eq(6), respectively.

$$\dot{Q}_{charging} = \dot{m}_2 h_2 - \dot{m}_3 h_3 \quad (5)$$

$$\dot{Q}_{Discharging} = \dot{m}_4 h_4 - \dot{m}_7 h_7 \quad (6)$$

1.2 Multi-Stage Flash Desalination (MSF)

To fulfill the water requirements of the greenhouse, seawater or saline groundwater is utilized as input to 16 stages once-through MSF desalination unit. The thermal energy of the PV/T system is used to pre-heat the saline water (seawater/groundwater). This heated seawater is then fed into the heater of the MSF unit, which is at the temperature of 97° C. This feed passes through the various stages of the MSF plant, and the distillate is separated out. While the low-temperature brine is pumped back to the sea.

The general expression of mass balance for any stage can be expressed as given by Eq(7):

$$\dot{m}_{b,n-1} = \dot{m}_{b,n} + \dot{m}_{d,n} \quad (7)$$

where the subscripts n is for the number of stages, b and d are for brine and distillate, respectively.

The general expression of energy balance for flashing can be stated as given by Eq(8):

$$\dot{m}_{b,n-1} h_{b,n-1} = \dot{m}_{b,n-1} h_{b,n} + \dot{m}_{d,n} h_{d,latent,n} \quad (8)$$

The general expression of energy balance for condensation can be written as given by Eq(9):

$$\dot{m}_{f,n+1} h_{f,n+1} + (\dot{m}_{d,n} + x_n \Sigma_1^{n-1} \dot{m}_v) h_{d,latent,n} = \dot{m}_{f,n} h_{f,n} \quad (9)$$

The salt balance at any stage can be computed as given by Eq(10):

$$\dot{m}_{b,n} C_{b,n} = \dot{m}_{f,n+1} C_{f,n+1} \quad (10)$$

where C is the salinity and the subscript f is for the seawater fed.

The ratio of the mass flow rate of feed water to the distillate water is expressed by:

$$\frac{\dot{m}_{feed}}{\dot{m}_{distillate}} = \frac{L_{hv}}{C_P \Delta F} + \frac{N-1}{N} \quad (11)$$

where $\dot{m}_{feed}$ is the mass flow rate of feed water, $\dot{m}_{distillate}$ is the mass flow rate of distillate water, $L_{hv}$ is the latent heat of vaporization, $C_p$ is specific heat under constant pressure, $\Delta F$ is the range of flashing temperature, and N is the number of stages.

The range of flashing temperature can be found from Eq(12)

$$\Delta F = (T_{b1} - T_{bN})\frac{N}{N-1} \quad (12)$$

where $T_{b1}$ and $T_{bN}$ are mine temperatures in tne tirst ana last stages, respectively. The performance ratio (PR) is the amount of distillate produced from the condensation of 1 kg of steam at an average temperature corresponding to the 2330 kJ/kg latent heat and can be expressed as follows:

$$PR = \frac{\dot{m}_{distillate}}{Q_{desalination}/2330} \quad (13)$$

where $\dot{Q}_{desalination}$ is the heat supplied to the desalination unit. The gain ratio (GR) is found using:

$$GR = \frac{L_{HS}}{2330}PR \quad (14)$$

where $L_{HS}$ is the latent heat of steam at atmospheric pressure.

1.3 Space Cooling

As discussed above, a vapor absorption system provides a promising solution when driven by solar energy to maintain the optimum temperature inside the greenhouse at the hot climate conditions. In these examples, the vapor absorption system using the LiBr—H$_2$O mixture as a working fluid is considered for the greenhouse space cooling. The example system includes a generator, absorber, condenser, evaporator and expansion valve. The generator utilizes the heat and generates the vapor of refrigerant (water in this case). These vapors are then condensed in the condenser by removing the latent heat. To reduce the pressure, the refrigerant is passed through the expansion device. The low-pressure refrigerant is directed towards the evaporator after passing through the expansion device. The water which is at low pressure absorbs heat from the evaporator and gets evaporated. Thus, the temperature of the evaporator drops as the heat is absorbed by the refrigerant. The vapors of refrigerant flow towards absorber and mix with the lean solution of the LiBr—H$_2$O mixture to make it a strong solution. This strong solution is pumped back to the generator and the cycle continues.

1.4 PV/T System

The combination of the PV panels with the thermal systems can reduce the temperature of cells and the heat gained from the PV can be utilized for useful purposes. In these examples, nanofluids are being used as a coolant in the PV/T system due to their superior thermo-physical properties over water and other fluids. In these examples, spectrum selective nanofluid is used, which absorbs solar radiations having wavelengths greater than 1400 nm, while flowing through the roof of the greenhouse. These radiations are the major cause of the rise in temperature inside the greenhouse and application of nanofluid will reduce the cooling load.

After flowing through the greenhouse roof and absorbing the excessive radiation, the nanofluid absorbs heat from the PV/T module, which is used to pre-heat the seawater. CuO nanofluid has a higher transmittance in the visible region of the solar spectrum, while opaque behavior to radiations having wavelengths higher than 1400 nm due to which it is considered as the working nanofluid for the present investigation. The important parameters of nanofluid considered in these examples are sumarized in Table 1 below.

TABLE 1

Nanofluid properties

| Nanoparticle | Base fluid | Concentration | Heat Capacity | Density |
|---|---|---|---|---|
| CuO | Water | 0.0005% | 0.531 kJ/kg · K | 6400 kg/m$^3$ |

Figure 3:
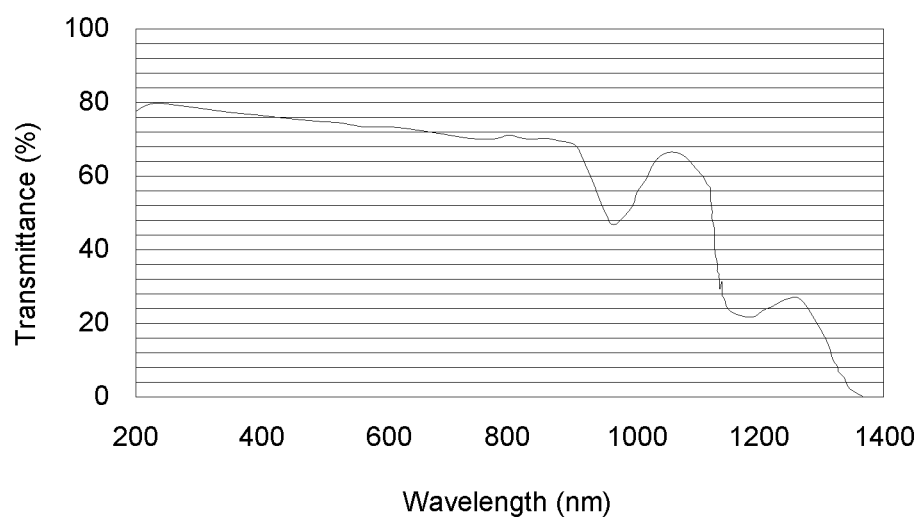
FIG. 3 shows a graph illustrating transmittance of CuO nanofluid for the solar spectrum.

The transmittance of CuO nanofluid (with 0.0005 vol. % concentration) to various wavelengths of the solar spectrum is depicted in FIG. 3.

The exergy gain rate of the nanofluid across PV/T can be found using Eq(15):

$$\dot{Ex}_{gain} = \dot{Ex}_{out} - \dot{Ex}_{in} = \dot{m}_{nf}C_{p,nf}\left[(T_{out,nf} - T_{in,nf}) - T_a\ln\left(\frac{T_{out,nf}}{T_{in,nf}}\right)\right] \quad (15)$$

where $C_{p,nf}$ is the specific heat of nanofluid and estimated using the below model:

$$C_{p,nf} = \frac{\emptyset\rho_{np}C_{p,np} + (1-\emptyset)\rho_{bf}C_{p,bf}}{\rho_{nf}} \quad (16)$$

where Ø is the concentration of nanoparticles in the base fluid. The subscripts nf, bf and np represent nanofluid, base fluid and nanoparticles, respectively. The density of nanofluid ($\rho_{nf}$) is as follows:

$$\rho_{nf} = \emptyset\rho_{np} + (1-\emptyset)\rho_{bf} \quad (17)$$

1.5 Greenhouse

The temperature inside the greenhouse will exceed the ambient temperature if there is no appropriate cooling system enabled, which will damage the plants. To maintain the viable temperature inside the greenhouse during hot climates, continuous removal of extra heat is vital. As the temperature inside the greenhouse should be less from the outside temperature, the heat flows into the greenhouse from the ambient.

The heat gained by greenhouse from conduction is found as:

$$\dot{Q}_{Conduction} = A_{sur}(T_a - T_{GH})/R \quad (18)$$

where $A_{sur}$ is the area of the greenhouse surface, R is resistance to heat flow. The solar irradiance adds heat to the greenhouse and for a regular greenhouse, it can be estimated as:

$$\dot{Q}_{radiation} = IA_{GH} \quad (19)$$

where $A_{GH}$ is the surface area of the greenhouse exposed to solar irradiance (roof and side wall). The plants use some portion of the visible spectrum (380-750 nm) and the remaining radiations contribute to heat addition in the greenhouse. The total heat accumulated in a regular greenhouse is found as:

$$\dot{Q}_{GH} = \dot{Q}_{radiation} + \dot{Q}_{Conduction} - \dot{Q}_{absorb,Plants} \quad (20)$$

For the case of greenhouse employing nanofluid through the roof, the $\dot{Q}_{radiation}$ can be computed as:

$$\dot{Q}_{radiation,nanofluid} = I_{Transmitted} A_{roof} + I A_{wall} \quad (21)$$

where $I_{Transmitted}$ is irradiance being transmitted through the roof of the greenhouse, and it is lower than a regular greenhouse since some portion is reflected and absorbed by the spectrum selective nanofluid. Hence, the total heat accumulated in the greenhouse using spectrum selective nanofluid can be written as:

$$\dot{Q}_{GH,nanofluid} = \dot{Q}_{radiation,nanofluid} + \dot{Q}_{Conduction} - \dot{Q}_{absorb,Plants} \quad (22)$$

The major part of accumulated heat in the greenhouse is due to radiation rather than others. The input parameters used for the present study are given in Table 2.

TABLE 2

Main input parameters used in the analysis of the proposed self-sustaining greenhouse system

| Parameter | Value | Unit |
|---|---|---|
| Area of collectors | 140 | m² |
| PCM temperature | 373 | K |
| Storage efficiency of PCM | 90 | % |
| Salinity of sea water | 35 | g/kg |
| Evaporator temperature | 286 | K |
| Gross Area of PV/T module | 1.37 | m² |
| PV/T module total area | 55 | m² |
| Nominal power | 170 | W |
| Average irradiance | 800 | W/m² |
| Gross area of PV module | 1.66 | m² |
| Total area of PV modules | 55 | m² |
| Nominal power of PV | 210 | W |
| Greenhouse dimensions | 12 × 2 × 2.4 | m³ |
| Greenhouse temperature | 292 | K |
| Isentropic pump efficiency | 85 | % |
| Reference temperature | 298 | K |
| Reference pressure | 101.325 | kPa |
| Sun surface temperature | 5778 | K |

System Analysis

Thermodynamic assessment of these examples is conducted using energy and exergy analysis. The following assumptions are made for analysis of system:

The system is operating under steady-state condition
The isentropic efficiencies of pumps are considered as 85%.
The kinetic and potential energy changes are negligible.
The PV/T back surface temperature is taken as 65° C.
The nanoparticles remain uniformly dispersed and stable in the base fluid.
The mass balance of the system components is stated as:

$$\Sigma \dot{m}_{in} = \Sigma \dot{m}_{out} \quad (23)$$

The energy balance is applied to each component of all sub-systems and general form of the energy balance excluding kinetic, potential and chemical energy changes is given by Eq (24)

$$\dot{Q}_{in} + \dot{W}_{in} + \Sigma_{in} \dot{m} h = \dot{Q}_{out} + \dot{W}_{out} + \Sigma_{out} \dot{m} h \quad (24)$$

The exergy analysis which is based on the second law of thermodynamics is a measure of available energy. The flow exergy can be defined as:

$$ex_i = (h_i - h_0) - T_0 \cdot (s_i - s_0) \quad (25)$$

The general form of exergy balance for each component of sub-system can be expressed as:

$$\Sigma_{in} \dot{m}_i ex_i + \dot{E}x_{Q_{in}} + \dot{E}x_{W_{in}} = \Sigma_{out} \dot{m}_i ex_i + \dot{E}x_{W_{out}} + \dot{E}x_D + \dot{E}x_{Q_{out}} \quad (26)$$

where $\dot{E}x_Q$ can be evaluated as:

$$\dot{E}x_Q = \left(1 - \frac{T_0}{T_s}\right) \cdot \dot{Q} \quad (27)$$

The rate of exergy destruction can also be calculated from the entropy generation as follows:

$$\dot{E}x_D = T_0 \dot{S}_{gen} \quad (28)$$

The entropy generation rate ($\dot{S}_{gen}$) can be found from the entropy balance equation as:

$$\frac{\dot{Q}_{in}}{T_s} + \dot{S}_{gen} + \sum_{in} \dot{m}_i s_i = \frac{\dot{Q}_{out}}{T_s} + \sum_{out} \dot{m}_i s_i \quad (29)$$

The energy and exergy balance equations of each component of the system are presented in Table 3.

TABLE 3

Energy and exergy balance equations for components of the proposed system

| Component | Energy balance | Exergy balance |
|---|---|---|
| Evacuated tube collector | $\dot{m}_1 h_1 + \dot{Q}_{collector} = \dot{m}_2 h_2 + \dot{Q}_{loss,Collector}$ | $\dot{m}_1 ex_1 + \dot{Q}_{collector}\left(1 - \frac{T_o}{T_s}\right) = \dot{m}_2 ex_2 + \dot{Q}_{loss,Collector}\left(1 - \frac{T_o}{T_s}\right) + \dot{E}_{d,Collector}$ |
| Storage tank | $\dot{m}_2 h_2 + \dot{m}_7 h_7 = \dot{m}_3 h_3 + \dot{m}_4 h_4 + \dot{Q}_{loss,Tank}$ | $\dot{m}_2 ex_2 + \dot{m}_7 ex_7 = \dot{m}_3 ex_3 + \dot{m}_4 ex_4 + \dot{Q}_{loss,Tank}\left(1 - \frac{T_o}{T_s}\right) + \dot{E}_{d,Tank}$ |
| Pump VI | $\dot{m}_3 h_3 + \dot{W}_{P-VI} = \dot{m}_1 h_1$ | $\dot{m}_3 ex_3 + \dot{W}_{P-VI} \dot{m}_1 ex_1 + \dot{E}_{d,P-VI}$ |
| Desalination | $\dot{m}_4 h_4 + \dot{m}_{10} h_{10} = \dot{m}_5 h_5 + \dot{m}_{11} h_{11} + \dot{m}_{12} h_{12} + \dot{Q}_{loss,MSF}$ | $\dot{m}_4 ex_4 + \dot{m}_{10} ex_{10} = \dot{m}_5 ex_5 + \dot{m}_{11} ex_{11} + \dot{m}_{12} ex_{12} + \dot{Q}_{loss,MSF}\left(1 - \frac{T_o}{T_s}\right) + \dot{E}_{d,MSF}$ |

TABLE 3-continued

Energy and exergy balance equations for components of the proposed system

| Component | Energy balance | Exergy balance |
|---|---|---|
| Generator | $\dot{m}_5 h_5 + \dot{m}_{21} h_{21} = \dot{m}_6 h_6 + \dot{m}_{15} h_{15} + \dot{m}_{22} h_{22}$ | $\dot{m}_5 ex_5 + \dot{m}_{21} ex_{21} = \dot{m}_6 ex_6 + \dot{m}_{15} ex_{15} + \dot{m}_{22} ex_{22} + \dot{E}_{d,Generagtor}$ |
| Condenser I | $\dot{m}_{15} h_{15} = \dot{m}_{16} h_{16} + \dot{Q}_{Cond-1}$ | $\dot{m}_{15} ex_{15} = \dot{m}_{16} ex_{16} + \dot{Q}_{Cond-1}\left(1 - \frac{T_o}{T_s}\right) + \dot{E}_{d,Cond-1}$ |
| Expansion valve I | $\dot{m}_{16} h_{16} = \dot{m}_{17} h_{17}$ | $\dot{m}_{16} ex_{16} = \dot{m}_{17} ex_{17} + \dot{E}_{d,Exp-1}$ |
| Evaporator | $\dot{m}_{17} h_{17} + \dot{Q}_{Evaporator} = \dot{m}_{18} h_{18}$ | $\dot{m}_{17} ex_{17} + \dot{Q}_{Evaporator}\left(1 - \frac{T_o}{T_s}\right) = \dot{m}_{18} ex_{18} + \dot{E}_{d,Evaporator}$ |
| Absorber | $\dot{m}_{18} h_{18} + \dot{m}_{24} h_{24} = \dot{m}_{19} h_{19} + \dot{Q}_{Absorber}$ | $\dot{m}_{18} ex_{18} + \dot{m}_{24} ex_{24} = \dot{m}_{19} ex_{19} + \dot{Q}_{Absorber}\left(1 - \frac{T_o}{T_s}\right) + \dot{E}_{d,Absorber}$ |
| Heat Exchanger I | $\dot{m}_{20} h_{20} + \dot{m}_{22} h_{22} = \dot{m}_{21} h_{21} + \dot{m}_{23} h_{23}$ | $\dot{m}_{20} ex_{20} + \dot{m}_{22} ex_{22} = \dot{m}_{21} ex_{21} + \dot{m}_{23} ex_{23} + \dot{E}_{d,HX-1}$ |
| PV/T | $\dot{m}_{26} h_{26} + \dot{Q}_{PVT} = \dot{m}_{27} h_{27} + \dot{W}_{PVT} + \dot{Q}_{loss,PVT}$ | $\dot{m}_{26} ex_{26} + \dot{Q}_{PVT}\left(1 - \frac{T_o}{T_s}\right) = \dot{m}_{27} ex_{27} + \dot{W}_{PVT} + \dot{Q}_{loss,PVT}\left(1 - \frac{T_o}{T_s}\right) + \dot{E}_{d,PVT}$ |

2.1 Energy Efficiency

The energy efficiencies of the ETC, MSF desalination plant, vapor absorption system and PV/T system are evaluated in this section.

The energy efficiency of the evacuated tube collector can be computed as $$\eta_{Collector} = \frac{\dot{Q}_{absorb}}{\dot{Q}_{collector}} = \frac{\dot{m} C_p (T_{out} - T_{in})}{\dot{Q}_{collector}} \quad (30)$$

where $(\dot{Q}_{collector} = A_{ETC} I)$.

The energy efficiency of the MSF plant can be expressed as $$\eta_{MSF} = \frac{\dot{m}_{11} h_{11} + \dot{m}_{12} h_{12} - \dot{m}_8 h_8}{(\dot{m}_4 h_4 - \dot{m}_5 h_5) + (\dot{m}_{27} h_{27} - \dot{m}_{28} h_{28})} \quad (31)$$

The energetic COP of the vapor absorption system can be calculated as $$COP_{en} = \frac{\dot{Q}_{evaporator}}{(\dot{m}_5 h_5 - \dot{m}_6 h_6) + \dot{W}_{P-II}} \quad (32)$$

The energy efficiency of the PV/T system is given as $$\eta_{PVT} = \frac{\dot{W}_{PVT} + \dot{m}_{27} h_{27} - \dot{m}_{26} h_{26} - W_{P-I}}{\dot{Q}_{PVT}} \quad (33)$$

where $Q_{PVT} = A_{PVT} I$.

The energy efficiency of the overall system with PV/T modules can be stated as $$\eta_{overall,PVT} = \frac{\dot{Q}_{evaporator} + \dot{W}_{PVT} + (\dot{m}_{27} h_{27} - \dot{m}_{28} h_{28}) + \dot{m}_{11} h_{11} - \dot{W}_{P-I} - \dot{W}_{P-II} - \dot{W}_{P-III} - \dot{W}_{P-IV} - \dot{W}_{P-V} - \dot{W}_{P-VI} - \dot{W}_{P-VII}}{\dot{Q}_{Solar}} \quad (34)$$

where $\dot{Q}_{Solar} = (A_{PVT} + A_{ETC}) I$.

The energy efficiency of the overall system employing photovoltaic (PV) panels instead of PV/T modules becomes:

$$\eta_{overall,PV} = \frac{\dot{Q}_{evaporator} + \dot{W}_{PV} + \dot{m}_{11} h_{11} - \dot{W}_{P-II} - \dot{W}_{P-III} - \dot{W}_{P-IV} - \dot{W}_{P-V} - \dot{W}_{P-VI} - \dot{W}_{P-VII}}{\dot{Q}_{Solar}} \quad (35)$$

In this case, $\dot{Q}_{Solar} = (A_{PV} + A_{ETC}) I$.

2.2 Exergy Efficiency

The exergy efficiencies for sub-systems and overall system are expressed by replacing the energy efficiency expression by their exergy counterparts in the previous section.

The exergy efficiency of the evacuated tube collector is defined as $$\psi_{Collector} = \frac{\dot{Q}_{absorb}\left(1 - \frac{T_o}{T_s}\right)}{\dot{Q}_{collector}\left(1 - \frac{T_o}{T_{sun}}\right)} \quad (36)$$

The exergy efficiency of the MSF desalination system can be evaluated as $$\psi_{MSF} = \frac{\dot{m}_{11}ex_{11} + \dot{m}_{12}ex_{12} - \dot{m}_{30}ex_{30}}{(\dot{m}_4 ex_4 - \dot{m}_5 ex_5) + (\dot{m}_{27}ex_{27} - \dot{m}_{28}ex_{28})} \qquad (37)$$

The exergetic COP of the vapor absorption system is given as $$COP_{ex} = \frac{\left|\dot{Q}_{Evaporator}\left(1 - \frac{T_o}{T_s}\right)\right|}{(\dot{m}_5 ex_5 - \dot{m}_6 ex_6) + \dot{W}_{P-II}} \qquad (38)$$

The exergy efficiency of the PV/T system can be stated as $$\psi_{PVT} = \frac{\dot{W}_{PVT} + \dot{m}_{27}ex_{27} - \dot{m}_{28}ex_{28} - \dot{W}_{P-I}}{\dot{Q}_{PVT}\left(1 - \frac{T_o}{T_{sun}}\right)} \qquad (39)$$

The exergy efficiency of the overall system employing PV/T modules can be found as $$\psi_{overall,PVT} = \frac{\left|\dot{Q}_{Evaporator}\left(1 - \frac{T_o}{T_s}\right)\right| + \dot{W}_{PVT} + (\dot{m}_{27}ex_{27} - \dot{m}_{28}ex_{28}) + \dot{m}_{11}ex_{11} - \dot{W}_{P-I} - \dot{W}_{P-II} - \dot{W}_{P-III} - \dot{W}_{P-IV} - \dot{W}_{P-V} - \dot{W}_{P-VI} - \dot{W}_{P-VII}}{\dot{Q}_{Solar}\left(1 - \frac{T_o}{T_{sun}}\right)} \qquad (40)$$

The exergy efficiency of the overall system using photovoltaic (PV) panels instead of PV/T modules becomes:

$$\psi_{overall,PV} = \frac{\left|\dot{Q}_{Evaporator}\left(1 - \frac{T_o}{T_s}\right)\right| + \dot{W}_{PV} + \dot{m}_{11}ex_{11} - \dot{W}_{P-II} - \dot{W}_{P-III} - \dot{W}_{P-IV} - \dot{W}_{P-V} - \dot{W}_{P-VI} - \dot{W}_{P-VII}}{\dot{Q}_{Solar}\left(1 - \frac{T_o}{T_{sun}}\right)} \qquad (41)$$

3 Results

The temperature, mass flow rate, specific enthalpy, specific entropy, and specific exergy at each point are presented in Table 4. The output values from the system are tabulated in Table 5.

TABLE 4

Thermodynamic properties of the complete system at various state

| State points no | Fluid type | Temperature (K) | Pressure (kPa) | Mass flow rate (kg/s) | Specific enthalpy (kJ/kg) | Specific entropy (kJ/kg · K) | Specific exergy (kJ/kg) |
|---|---|---|---|---|---|---|---|
| 1 | Water | 373.1 | 200 | 2.48 | 419 | 1.31 | 34.18 |
| 2 | Water | 378 | 200 | 2.48 | 439.7 | 1.36 | 38.45 |
| 3 | Water | 373 | 200 | 2.48 | 418.6 | 1.31 | 34.09 |
| 4 | Thermal oil | 370 | 200 | 0.49 | 217.7 | 0.69 | 14.73 |
| 5 | Thermal oil | 353 | 200 | 0.49 | 181.1 | 0.59 | 8.71 |
| 6 | Thermal oil | 324 | 200 | 0.49 | 119.6 | 0.40 | 1.55 |
| 7 | Thermal oil | 324.1 | 200 | 0.49 | 120.7 | 0.41 | 1.67 |
| 8 | Sea water | 298 | 101 | 0.27 | 104.3 | 0.37 | 0 |
| 9 | Sea water | 308 | 101 | 0.27 | 146.1 | 0.50 | 0.69 |
| 10 | Sea water | 308.1 | 150 | 0.27 | 146.6 | 0.50 | 0.75 |
| 11 | Water | 314 | 7.726 | 0.02 | 182.2 | 0.58 | 12.76 |
| 12 | Sea water | 314 | 7.726 | 0.25 | 172.01 | 0.61 | 8.634 |
| 13 | Sea water | 314.1 | 200 | 0.25 | 172.8 | 0.61 | 8.6 |
| 14 | Water | 314.1 | 200 | 0.02 | 182.9 | 0.59 | 12.8 |
| 15 | Water | 353 | 5.583 | 0.01 | 2650 | 8.61 | 87.39 |
| 16 | Water | 308 | 5.583 | 0.01 | 146 | 0.50 | 0.59 |
| 17 | Water | 286 | 1.563 | 0.01 | 146 | 0.52 | −2.92 |
| 18 | Water | 286.8 | 1.563 | 0.01 | 2526 | 8.81 | −95.61 |
| 19 | LiBr—H$_2$O | 308 | 1.563 | 0.06 | 71.5 | 0.25 | 390.3 |
| 20 | LiBr—H$_2$O | 308.1 | 5.583 | 0.06 | 71.72 | 0.25 | 390.3 |
| 21 | LiBr—H$_2$O | 331.8 | 5.583 | 0.06 | 123.9 | 0.41 | 394 |
| 22 | LiBr—H$_2$O | 353 | 5.583 | 0.05 | 195.6 | 0.45 | 538.5 |
| 23 | LiBr—H$_2$O | 319.8 | 5.583 | 0.05 | 132.2 | 0.26 | 531.3 |
| 24 | LiBr—H$_2$O | 319.8 | 1.563 | 0.05 | 132.2 | 0.26 | 531.3 |
| 25 | Nanofluid | 308.1 | 200 | 0.17 | 145.7 | 0.50 | 0.7 |
| 26 | Nanofluid | 315.5 | 200 | 0.17 | 176.4 | 0.60 | 2.04 |
| 27 | Nanofluid | 338 | 200 | 0.17 | 269.7 | 0.89 | 10.24 |
| 28 | Nanofluid | 308 | 200 | 0.17 | 145.3 | 0.50 | 0.68 |

TABLE 5

The output values from system

| Output | Value |
| --- | --- |
| Greenhouse cooling requirement employing nanofluid in the roof (kW) | 25.4 |
| Heat of PV/T system to preheat seawater (kW) | 20.9 |
| $\dot{W}_{Electricity}$ (kW) | 6.62 |
| $\dot{W}_{Pump}$ (kW) | 1.90 |
| Mass flow rate of freshwater produced (kg/s) | 0.025 |
| Total exergy destruction rate (kW) | 82.53 |

Figure 4:
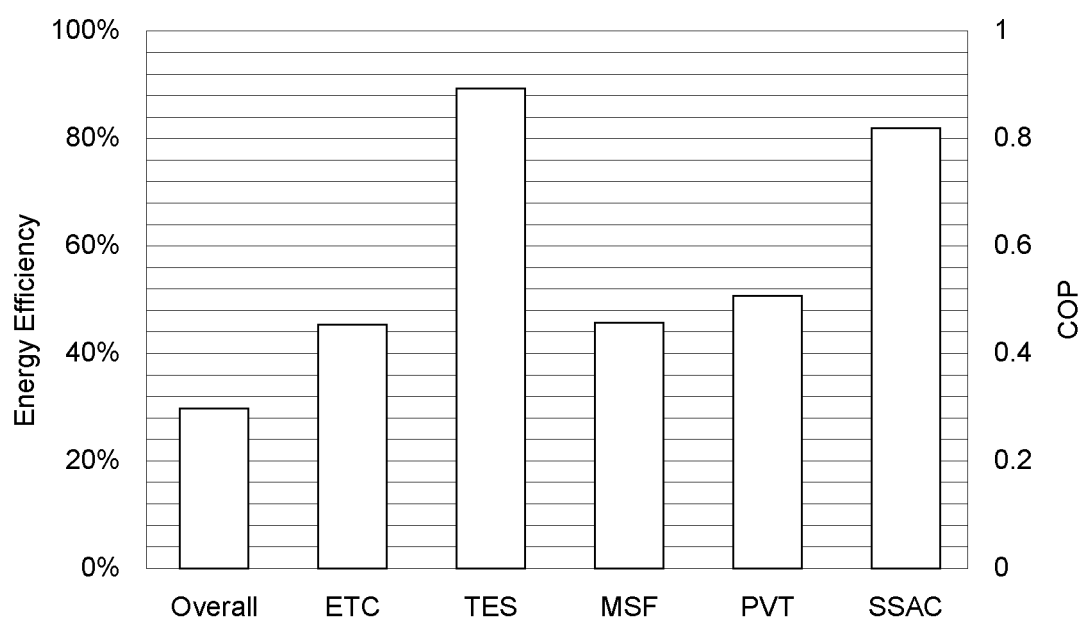
FIG. 4 shows a graph illustrating energy efficiencies of sub-systems and the overall system.
Figure 5:
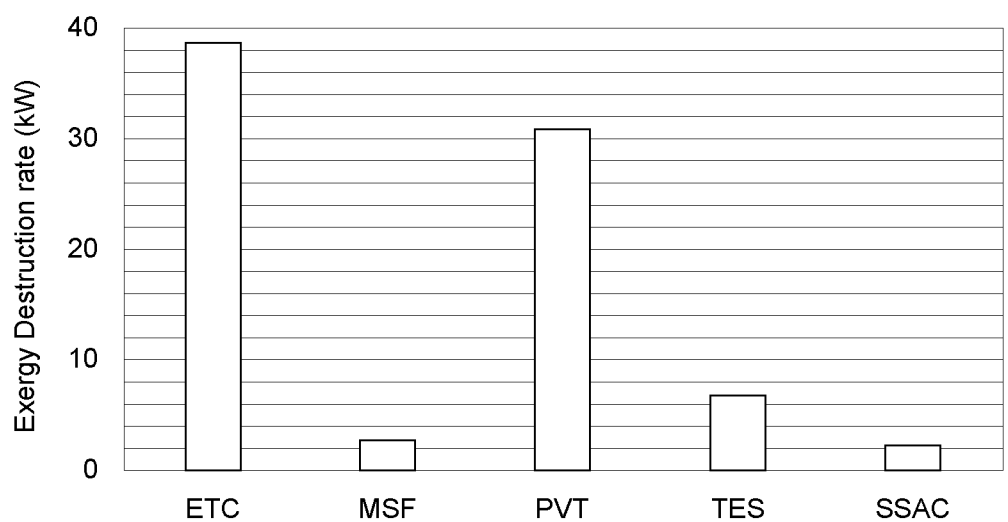
FIG. 5 shows a graph illustrating exergy destruction rates of sub-systems.

The energy efficiency of each sub-system and the overall system is depicted in FIG. 4. The exergy destruction rate of sub-systems of the proposed system is shown in FIG. 5. The highest exergy destruction rate of 38.9 kW is found in evacuated tube collectors (ETC) followed by the photovoltaic thermal system (PV/T) with an exergy destruction rate of 31.2 kW. The exergy efficiency of the overall system can be improved with a reduction in the exergy destruction rate of evacuated tube collectors and photovoltaic thermal systems.

3.1 Effect of the Mean Temperature of Fluid on ETC Efficiencies

Figure 6:
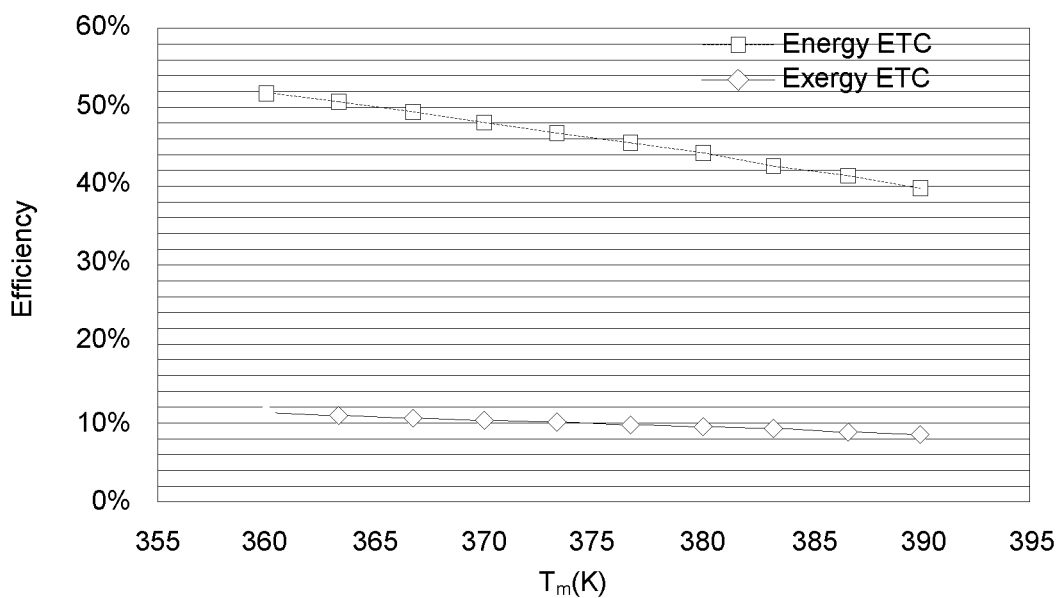
FIG. 6 shows a graph illustrating ETC efficiencies by changing mean temperature of the working fluid.

According to FIG. 6, both efficiencies of the ETC decreased with the increase in mean temperature $(T_{in}+T_{out}/2)$ of fluid. The increase in the average temperature of fluid means that the difference between outlet and inlet temperature of the fluid is reduced. The useful heat gained by fluid deteriorates as the difference between outlet and inlet temperature of fluid decreases, due to which energy and exergy efficiencies of the ETC also decrease.

3.2 Effect of Solar Irradiance on ETC Efficiencies

Figure 7:
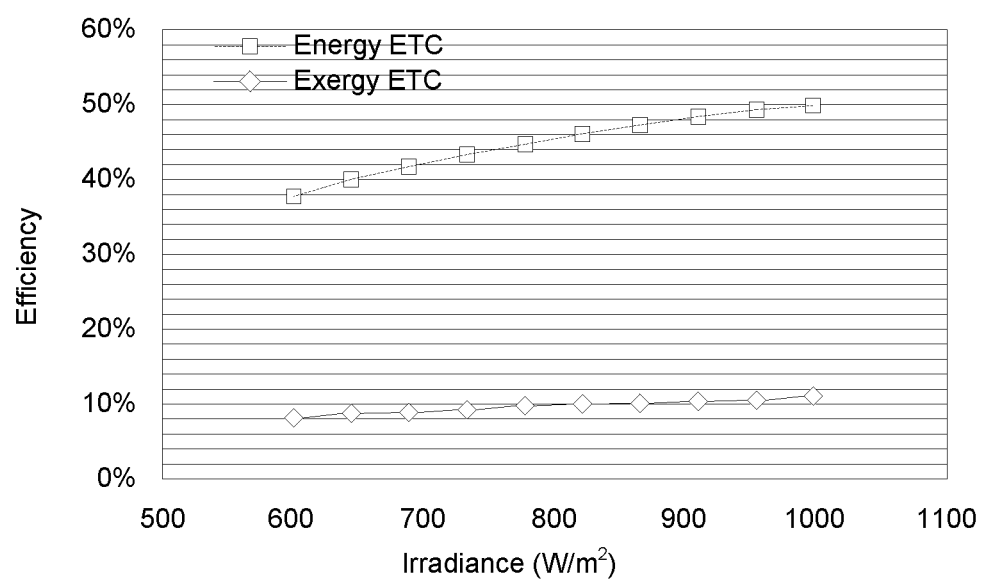
FIG. 7 shows a graph illustrating ETC efficiencies with varying solar irradiance.

Solar irradiance varies during day time due to which the efficiency of the ETC changes with the irradiance. FIG. 7 depicts the variation in energy and exergy efficiency of evacuated tube collectors as a function of solar irradiance.

The increase in solar irradiance caused a reduction in first and second-order heat loss coefficients, which leads to improvement in energy and exergy efficiency of evacuated tube collectors. The enhancement in energy efficiency was found to be more significant than exergy efficiency.

3.3 Effect of Seawater Temperature on the Distilled Rate and Gain Ratio

Figure 8:
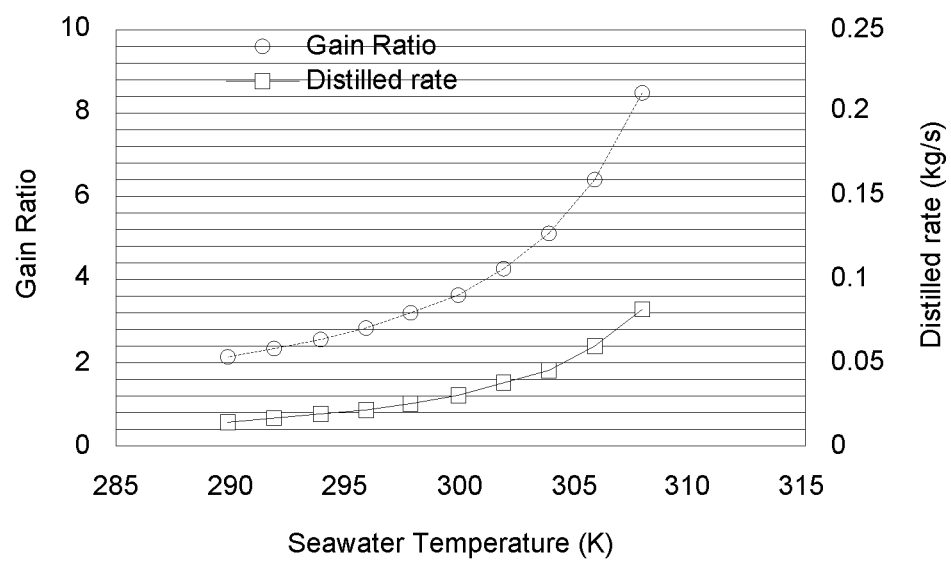
FIG. 8 shows a graph illustrating changes in the mass flow rate of distilled water and gain ratio by varying seawater temperatures.

The mass flow rate of distilled water and gain ratio increased with the rise in seawater temperature as illustrated in FIG. 8. The increase in the rate of distilled water with sea temperature is parabolic. The seawater at higher temperature boils easily and facilitates the distillation of freshwater due to which the distilled rate increases parabolically. The gain ratio is in direct relation with the mass of distilled water. As the mass of distilled water increases at elevated sea temperature, the gain ratio also enhances with augmentation in sea temperature.

3.4 Effect of the Seawater Temperature on Heat Supplied and Feed Rate to MSF

Figure 9:
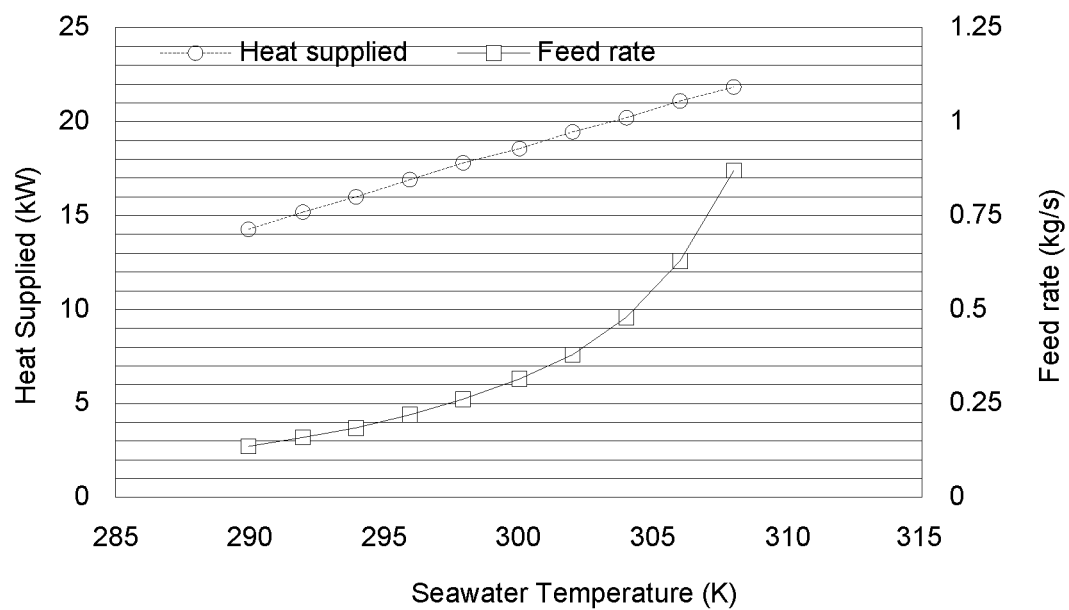
FIG. 9 shows a graph illustrating changes in the heat supplied and feed rates by varying seawater temperature.

The effects of seawater temperature on the feed rate of seawater to the desalination unit and heat supplied to the desalination unit are depicted in FIG. 9.

When seawater is at a higher temperature, then more quantity of seawater can be fed, as it will require less amount of heat during the desalination process than seawater which is a comparatively low temperature. Therefore, the feed rate is found to enhance with the rise in seawater temperature. On the other hand, when the feed rate is increased then the amount of heat needed to be supplied for desalination will also increase. The increase in heat supplied and feed rate to desalination unit is linear and parabolic, respectively, with the rise in seawater temperature.

3.5 Effect of Solar Irradiance on Efficiencies of PV/T

Figure 10:
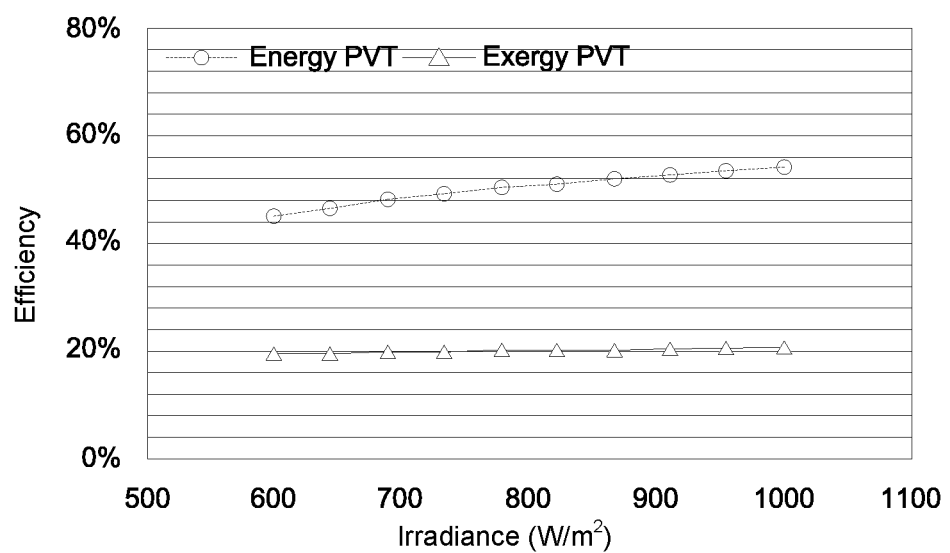
FIG. 10 shows a graph illustrating changes in the PV/T system efficiencies with varying solar irradiance.

The impact of solar irradiance on energy and exergy efficiency of the PV/T system is shown in FIG. 10. With the increase in solar irradiance, the energy and exergy efficiencies of the PV/T system increased. The rise in the energy efficiency of the PV/T system is more significant than exergy efficiency. The augmentation in irradiance improved the thermal efficiency of the system due to which an improvement in energy and exergy efficiency is observed.

3.6 Effect of Solar Irradiance on Cooling Load of Greenhouse

Figure 11:
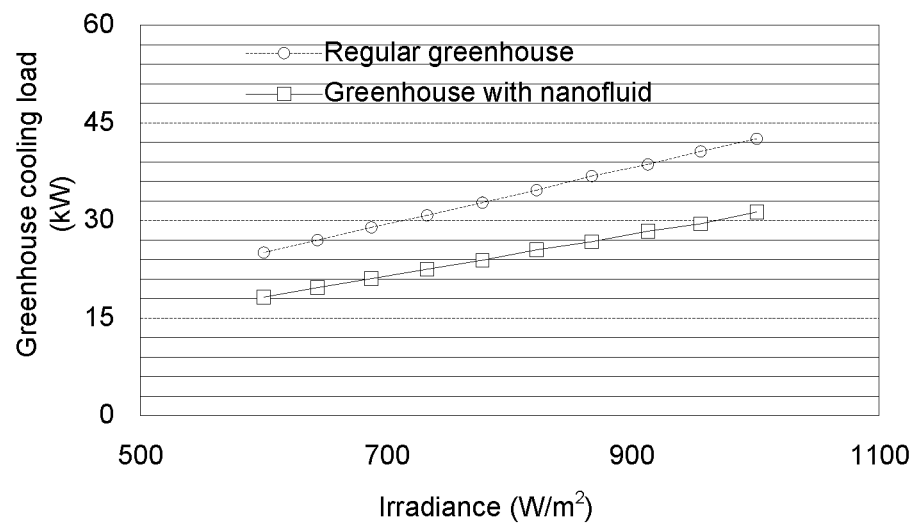
FIG. 11 shows a graph illustrating cooling load of greenhouse (with and without nanofluid) with varying solar irradiance.

FIG. 11 represents the cooling load requirement of the greenhouse with and without application of spectrum selective nanofluid. The sunlight consists of infrared radiations, which are also known as heat radiations. The nanofluids are capable of absorbing these radiations while transmitting the visible spectrum of sunlight, which is necessary for photosynthesis. The difference in the cooling load of the greenhouse with and without application nanofluid increased with the rise in solar irradiance.

3.7 Efficiencies of the Overall System with PV/T or PV Modules

Figure 12:
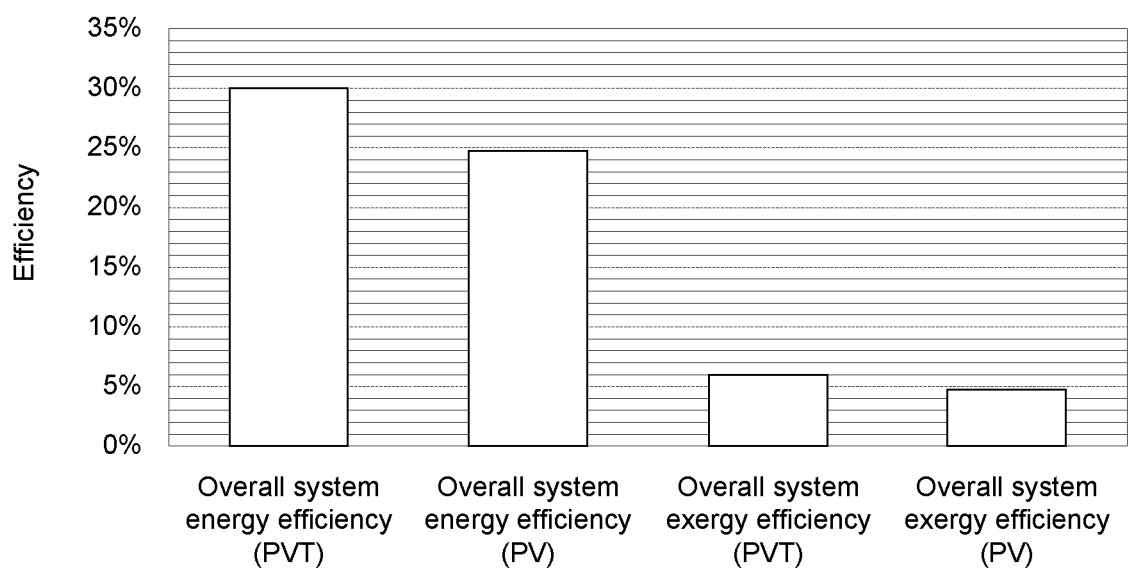
FIG. 12 shows a graph illustrating energy and exergy efficiencies of the overall system using PV/T with nanofluid and sole PV.

An effort has been made to investigate and compare the efficiencies of the overall system employing PV/T system with spectrum selective nanofluid, and system using only PV panels. It has been found that the application of PV/T with spectrum selective nanofluid on the roof not only reduced the cooling load of the greenhouse, but also preheated seawater entering the desalination unit, which improved the energy and exergy efficiencies of the overall system. On the other hand, PV panels only provide electricity without any useful thermal energy, and in that case, solar radiations of all wavelengths are freely entering the greenhouse and thus increasing cooling load. The energy and exergy efficiencies of both systems are comparatively presented in FIG. 12. The energy efficiency of the overall system improved from 24.76% to 30% with the application of the PV/T system employing spectrum selective nanofluid. Similarly, the exergy efficiency of the overall system enhanced from 4.73% to 5.88%, when PV panels are replaced with the PV/T system.

3.8 Effect of Reference Temperature on Exergy Destruction Rates of Sub-Systems

Figure 13:
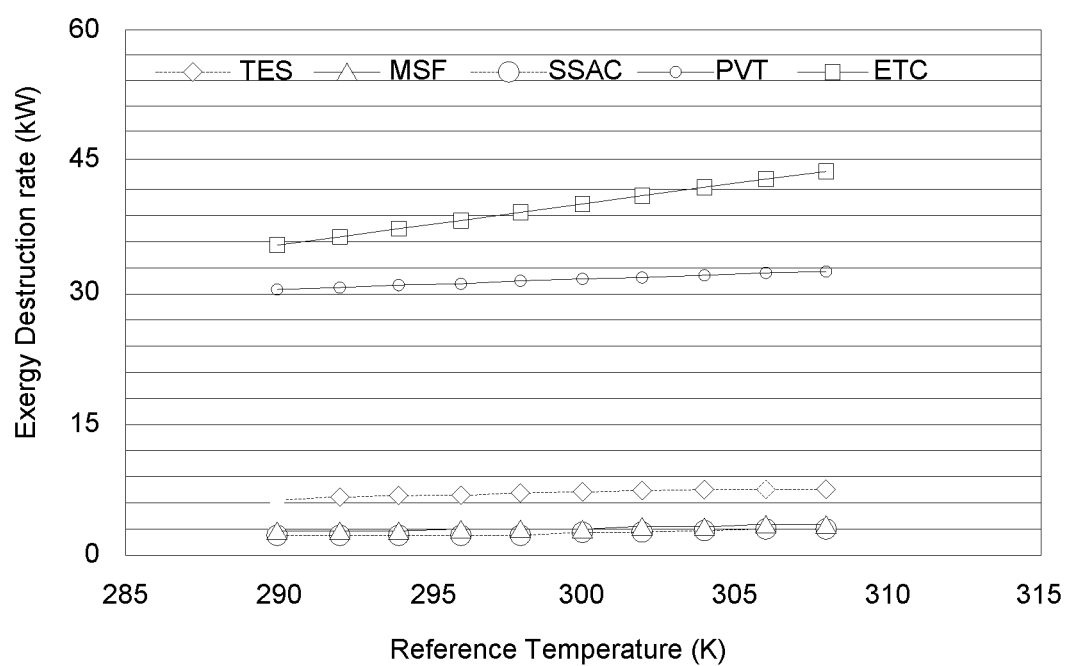
FIG. 13 shows a graph illustrating the effects of the reference temperature on the exergy destruction rates of subsystems.

The effect of variation in reference temperature on the exergy destruction rate of sub-systems is depicted in FIG. 13. The exergy destruction rates of ETCs and the PV/T systems increase about 24.1% and 7.2%, respectively, as the reference temperature rises from 290 K to 308 K. The increase in the reference temperature strengthens the irreversibilities in the components of the sub-systems, which caused a rise in the exergy destruction rates.

Figure 14:
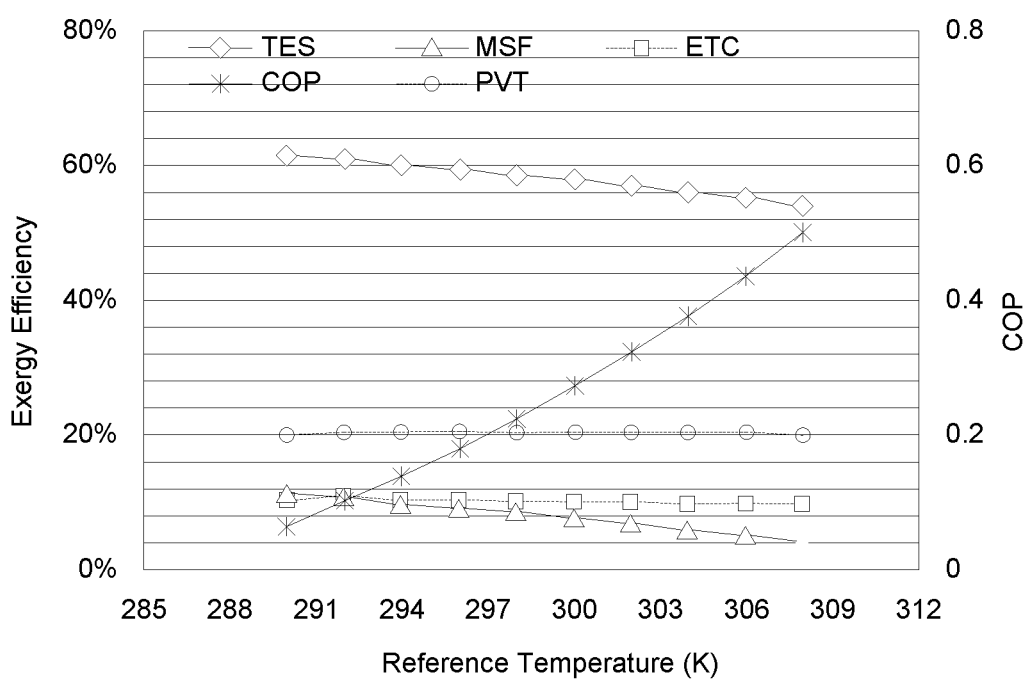
FIG. 14 shows a graph illustrating changes in the exergy efficiencies with varying reference temperatures.

3.9 Effect of Reference Temperature on Exergy Efficiencies of Sub-Systems and Overall System The effects of variation in reference temperature on the exergy efficiency of sub-systems and the overall system are shown in FIG. 14. Except for the absorption cooling system, the exergy efficiencies of sub-systems and overall system decrease with the rise in the reference temperature. As the reference temperature increases from 290 K to 308 K, the exergy efficiency reduces from 10.9% to 4.05% for the multi-stage flash desalination unit, from 10.2% to 9.945% for evacuated tube collector and from 61.48% to 54.07% for thermal energy storage. The exergetic COP of the absorption cooling system improves from 0.06 to 0.5 with the enhancement in the reference temperature from 290 K to 308 K.

3.10 Cooling Comparison with a Vapor Compression-Based Regular Greenhouse

Figure 15:
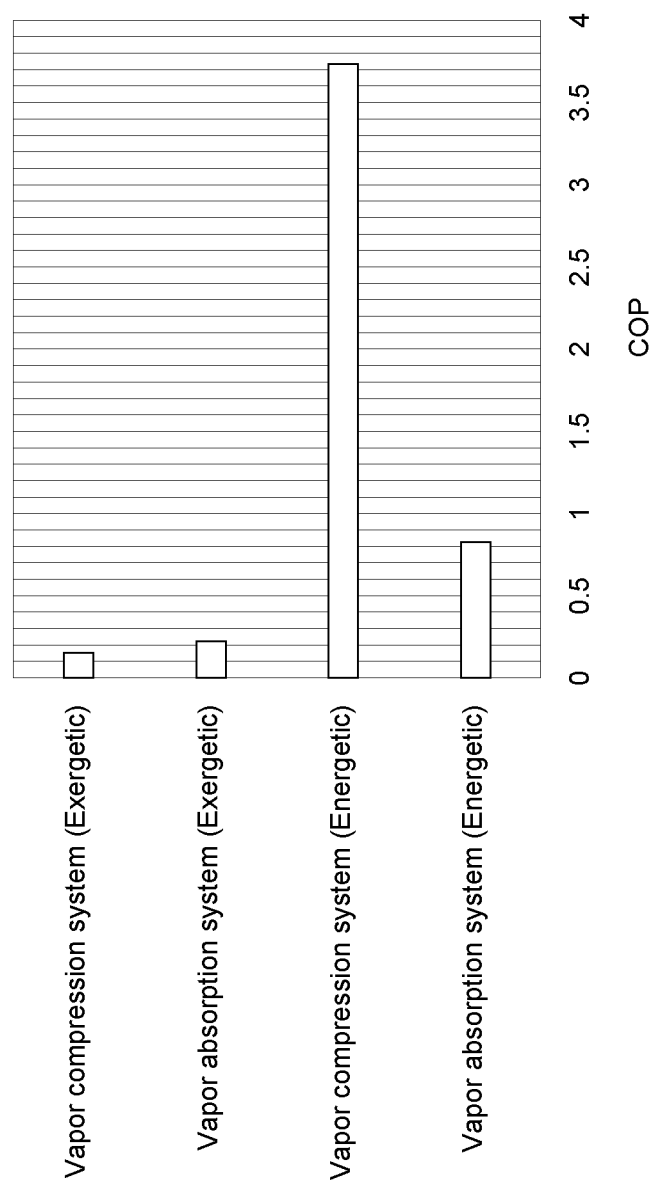
FIG. 15 shows a graph illustrating a comparison of the COPs between vapor absorption and vapor compression cooling systems used in the greenhouses.
Figure 16:
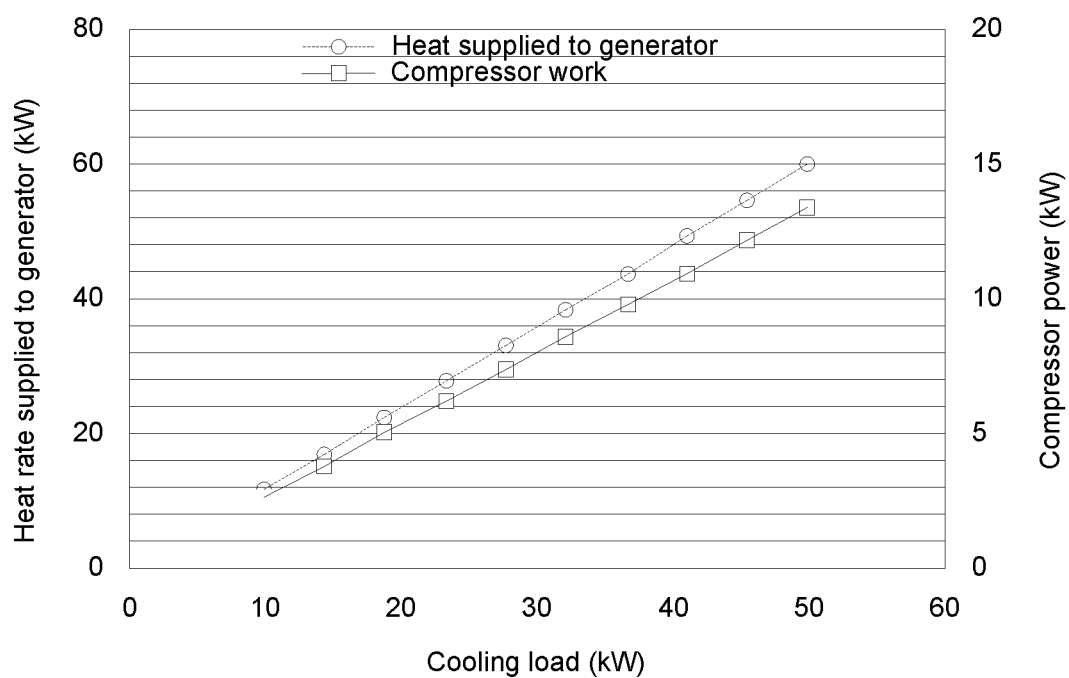
FIG. 16 shows a graph illustrating changes in the energy inputs to vapor absorption and vapor compression cooling systems with varying cooling load.

For hot climatic conditions, usually, a vapor compression-based cooling system is used in greenhouses to maintain the temperature in the optimal range. In order to compare the proposed integrated cooling system for the greenhouse with a regular vapor compression-based cooling system, energetic, and exergetic COP's of both systems have been calculated under the same conditions and presented in FIG. 15.

The COP of the vapor compression system is found to be much higher than the vapor absorption system, while the energetic COP is slightly lower. The energy input to the vapor compression system is electrical energy, which is required by the compressor, whereas in the case of a vapor absorption system, the energy input is in form of heat, which is used to produce vapors of refrigerant in the generator. The heat is low graded energy, while electrical energy is high graded energy. The sources of high graded energy are more expansive than low graded energy. The heat is required by the generator to produce vapors of refrigerant and power is required by the compressor to compress the vapor refrigerant, where they are depicted as a function of cooling load in FIG. 17. Although the compressor required less power in comparison to the generator, it requires a more initial investment, maintenance cost and area for PV to produce extra electricity in order to meet the energy demands of the compressor.

4 Conclusions

The solar spectrum consists of infrared radiation, which traps inside the greenhouse and causes an excessive rise in temperature. In hot climatic conditions, continuous removal of heat from the greenhouse is necessary for the healthy growth of plants. The supply of electricity and water to a remotely located greenhouse is another challenge. Aspects of the present disclosure provide a self-sustaining greenhouse utilizing solar energy to meet the electricity, water and cooling requirements. The electricity production is achieved by using PV/T system, which is employing spectrum selective nanofluid to absorb heat from PV/T modules and solar radiations with wavelengths greater than a predetermined wavelength from the roof of the greenhouse. The visible spectrum of sunlight, which is important for photosynthesis is transmitted to the plants in the greenhouse by spectrum selective nanofluid. The thermal energy obtained from PV/T system is used to pre-heat the seawater being fed to the desalination unit for the production of freshwater. The heat requirement of the desalination unit and absorption cooling system is fulfilled from thermal energy storage, which is being charged by evacuated tube collectors. In order to gain a better insight into this system, energy and exergy analyses of each sub-system and the overall system are performed.

The increase in the reference temperature has a positive effect on the exergetic COP of the absorption cooling system, whereas the exergy efficiencies of other sub-systems decline with the rise in the reference temperature. The increase in solar irradiance positively influenced the efficiencies of evacuated tube collectors and PV/T system. The overall energy and exergy efficiencies of the system are found to be 30% and 5.88%, respectively. The net electricity production is 4.72 kW, which can be stored for night usage when the sun is not available. The production of freshwater is 0.025 kg/s, and extra water can be stored for usage in cloudy conditions. The proposed integrated system is capable to produce heating and cooling rate of 20.9 kW and 25.4 kW, respectively. The application of nanofluid is capable of about 26% reduction in the cooling load requirement of the greenhouse. The replacement of the PV panels with PV/T system caused an improvement of 21.2% and 24.3% in energy and exergy efficiencies of overall system, respectively.

NOMENCLATURE

A Area, $m^2$
COP Coefficient of performance
$C_p$ Specific heat at constant pressure, kJ/kg-K
ETC Evacuated tube collector
$\dot{Ex}$ Exergy rate, kW
ex Specific exergy, kJ/kg
$\dot{E}_d$ Exergy destruction rate, kW
h Specific enthalpy, kJ/kg
I Irradiance, $W/m^2$
$\dot{m}$ Mass flow rate, kg/s
MSF Multi-stage flash desalination
N Number of stages
P Pressure, kPa
$\dot{Q}$ Heat rate, kW
PV/T Photovoltaic thermal system
s Specific entropy, kJ/kg K
$\dot{S}$ Entropy generation rate, kJ/s.K
SSAC Single-stage absorption cooling system
T Temperature, K
$\dot{W}$ Power, kW
Greek Letters
η Energy efficiency, %
ψ Exergy efficiency, %
ρ Density, $kg/m^3$
Ø Volume fraction
Subscripts
0 Reference state
1,2, . . . i State points
a Ambient
bf Base fluid
D Destruction
en Energy
ex Exergy
GH Greenhouse
in Inlet/Input
m mean
nf Nanofluid
np Nanoparticle
out Outlet/Output
P Pump
Q Heat loss/gain
s Sink or source
th Thermal More detailed descriptions of the analysis of the example systems are disclosed in a paper entitled "Performance Assessment of Spectrum Selective Nanofluid-Based Cooling for a Self-Sustaining Greenhouse", Energy Technology 9(1) (December 2020) written by Sajid et al., which is herein incorporated by reference in its entirety.

Reference throughout the specification to "various aspects," "some aspects," "an example," "some examples," "other examples," or "one aspect" means that a particular feature, structure, or characteristic described in connection with the aspect is included in at least one example. Thus, appearances of the phrases "in various aspects," "in some aspects," "certain embodiments," "an example" "some examples," "other examples," "certain other embodiments," or "in one aspect" in places throughout the specification are not necessarily all referring to the same aspect. Furthermore, the particular features, structures, or characteristics illustrated or described in connection with one example may be combined, in whole or in part, with features, structures, or characteristics of one or more other aspects without limitation.

It is to be understood that at least some of the figures and descriptions herein have been simplified to illustrate elements that are relevant for a clear understanding of the disclosure, while eliminating, for purposes of clarity, other elements. Those of ordinary skill in the art will recognize, however, that these and other elements may be desirable. However, because such elements are well known in the art, and because they do not facilitate a better understanding of the disclosure, a discussion of such elements is not provided herein.

The terminology used herein is intended to describe particular embodiments only and is not intended to be limiting of the present disclosure. As used herein, the singular forms "a", "an" and "the" are intended to include the plural forms as well, unless otherwise indicated. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term 'at least one of X or Y' or 'at least one of X and Y' should be interpreted as X, or Y, or X and Y.

It should be understood that various changes and modifications to the examples described herein will be apparent to those skilled in the art. Such changes and modifications can be made without departing from the spirit and scope of the present subject matter and without diminishing its intended advantages. It is therefore intended that such changes and modifications be covered by the appended claims.

The invention is claimed as follows:

1. A system comprising:
    a greenhouse;
    spectrum selective nanofluid configured to flow around the greenhouse roof and absorb some or significant portion of solar spectrum having a wavelength equal to or greater than 750 nm to reduce a cooling load inside the greenhouse;
    an evacuated tube collector (ETC) configured to convert a solar energy into a first heat;
    a photovoltaic thermal (PV/T) system having a photovoltaic (PV) cell, wherein the nanofluid is further configured to absorb a second heat from the PV/T system, reducing a temperature of the PV cell, wherein the second heat absorbed from the PV/T system is used to pre-heat saline water;
    a desalination mechanism configured to receive the pre-heated saline water and distill the pre-heated saline water; and
    a cooling mechanism configured to cool the greenhouse using the first heat generated from the ETC.

2. The system of claim 1, further comprising a thermal storage tank, wherein working fluid absorbs the first heat from the ETC and transfers the first heat to the thermal storage tank, wherein the first heat transferred to the thermal storage tank is used to operate the desalination mechanism and the cooling mechanism.

3. The system of claim 1, wherein the cooling mechanism comprises:
    a generator configured to, using the first heat from the ETC, generate a vapor of a refrigerant;
    a condenser configured to condense the vapor to produce a condensed refrigerant;
    an expansion device configured to reduce a pressure of the condensed refrigerant to produce a low pressure refrigerant; and
    an evaporator, wherein the system is configured to provide the low pressure refrigerant to the evaporator so that the low pressure refrigerant absorbs a third heat from the evaporator and is evaporated, wherein the absorption of the third heat from the evaporator reduces a temperature of the evaporator, thereby cooling the greenhouse connected to the evaporator.

4. The system of claim 3, wherein the cooling mechanism further comprises an absorber configured to receive the evaporated refrigerant and mix the evaporated refrigerant with a lean solution of an additional refrigerant to produce a strong solution of a second refrigerant, wherein the strong solution of the second refrigerant is transferred to the generator.

5. The system of claim 1, wherein the nanofluid comprises CuO/water, CuS-MgO/water, or CuS-ZnO/water.

6. The system of claim 1, wherein the nanofluid is configured to transmit visible spectrum having a wavelength equal to or greater than 400 nm and lower than 750 nm.

7. The system of claim 1, further comprising a duct channel, wherein the nanofluid is configured to flow around the greenhouse through the duct channel.

8. The system of claim 1, further comprising a pump configured to circulate the nanofluid.

9. The system of claim 4, wherein the refrigerant comprises LiBr-H2O.

* * * * *